United States Patent
Barimani et al.

(10) Patent No.: US 10,577,036 B2
(45) Date of Patent: Mar. 3, 2020

(54) CONSTRUCTION MACHINE FOR WORKING A GROUND PAVEMENT

(71) Applicant: Wirtgen GmbH, Windhagen (DE)

(72) Inventors: Cyrus Barimani, Koenigswinter (DE); Sebastian Hofrath, Hennef (DE); Philipp Kraemer, Linz (DE)

(73) Assignee: Wirtgen GmbH (DE)

( * ) Notice: Subject to any disclaimer, the term of this patent is extended or adjusted under 35 U.S.C. 154(b) by 169 days.

(21) Appl. No.: 15/836,994

(22) Filed: Dec. 11, 2017

(65) Prior Publication Data

US 2018/0170462 A1 Jun. 21, 2018

(30) Foreign Application Priority Data

Dec. 15, 2016 (DE) .................. 10 2016 225 189

(51) Int. Cl.
*B62D 55/084* (2006.01)
*B60G 17/005* (2006.01)
(Continued)

(52) U.S. Cl.
CPC ......... *B62D 55/084* (2013.01); *B60G 17/005* (2013.01); *B62D 55/065* (2013.01);
(Continued)

(58) Field of Classification Search
CPC ............................. B60G 17/00; B60G 17/005
See application file for complete search history.

(56) References Cited

U.S. PATENT DOCUMENTS

| 7,029,014 B2 * | 4/2006 | Hamm ................... B60G 7/006 267/265 |
| 9,085,857 B2 | 7/2015 | Held et al. |
| | (Continued) | |

FOREIGN PATENT DOCUMENTS

| CN | 103362059 A | 10/2013 |
| CN | 105291264 A | 2/2016 |
| | (Continued) | |

OTHER PUBLICATIONS

China Office Action in corresponding CN 2017112988383, dated Dec. 8, 2017, 1 page (not prior art).

*Primary Examiner* — Kevin Hurley
(74) *Attorney, Agent, or Firm* — Lucian Wayne Beavers; Patterson Intellectual Property Law, PC

(57) ABSTRACT

In a construction machine (1) for working a ground pavement (29), comprising a machine frame (2), no less than one lifting column (14), no less than one travelling device (4, 6) which is connected to the machine frame (2) via the no less than one lifting column (14), where the machine frame (2) is adjustable in height relative to the ground pavement (29) by means of the lifting column (14), where the lifting column (14) comprises a column element (18) and a guiding element (16), where, during height adjustment of the lifting column (14), the column element (18) is guidable into and out of the guiding element (16) in a telescoping fashion, it is specified for the following features to be achieved: that a mount (26) is specified at the column element (18) into which a locking element (24) is insertable in such a fashion that the locking element (24), in the inserted condition, projects, at least in part, vis-à-vis the column element (18).

11 Claims, 4 Drawing Sheets

(51) Int. Cl.
  *E01C 23/088* (2006.01)
  *E01C 23/00* (2006.01)
  *B62D 55/065* (2006.01)
  *E01C 23/12* (2006.01)

(52) U.S. Cl.
  CPC ............ *E01C 23/00* (2013.01); *E01C 23/088* (2013.01); *E01C 23/127* (2013.01)

(56) References Cited

U.S. PATENT DOCUMENTS

| | | | |
|---|---|---|---|
| 9,296,273 B2 * | 3/2016 | Slawson | B60G 17/005 |
| 9,963,841 B2 * | 5/2018 | Nacke | E01C 23/088 |
| 2009/0035064 A1 | 2/2009 | Holl et al. | |
| 2016/0177522 A1 | 6/2016 | Nacke et al. | |
| 2018/0170462 A1 | 6/2018 | Barimani et al. | |

FOREIGN PATENT DOCUMENTS

| | | |
|---|---|---|
| CN | 207714099 U | 8/2018 |
| DE | 8604868 U1 | 4/1986 |
| DE | 102014019168 A1 | 6/2016 |

* cited by examiner

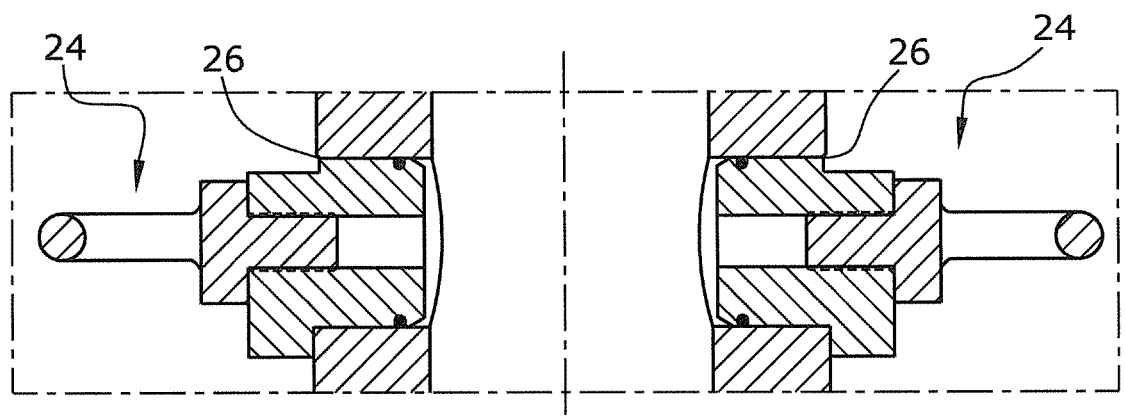
Fig.6
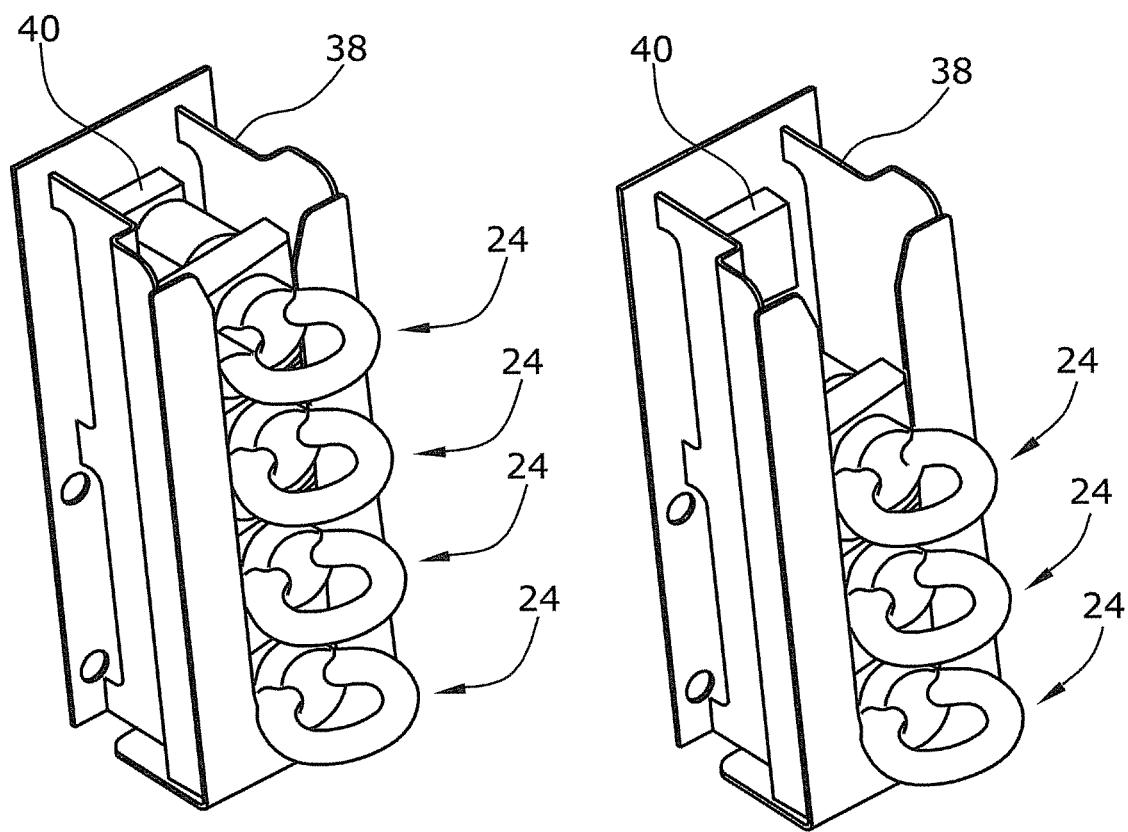
Fig.7                    Fig.8

CONSTRUCTION MACHINE FOR WORKING A GROUND PAVEMENT

BACKGROUND OF THE INVENTION

1. Field of the Invention

The invention relates to a construction machine, as well as to a method for transferring a construction machine for working a ground pavement into a maintenance position.

2. Description of the Prior Art

Construction machines for working a ground pavement usually comprise a machine frame, no less than one lifting column, and no less than one travelling device, where the no less than one lifting column is connected to the machine frame. The machine frame may be adjustable in height relative to the ground pavement by means of the lifting column, where the lifting column comprises a column element and a guiding element, where, during height adjustment of the lifting column, the column element is retractable into and extendible out of the guiding element in a telescoping fashion.

During maintenance of the construction machine, the construction machine needs to be secured against inadvertent dropping of the construction machine due to, for example, a malfunction of the lifting cylinders. Simple supports are frequently used for this purpose, which are clamped tight between the travelling device and the machine frame. Said supports need to always be carried along on the construction machine so that maintenance procedures can be performed at any given time.

There is an increasing need to simplify such securing means.

SUMMARY OF THE INVENTION

It is therefore the object of the present invention to create a construction machine and a method for working a ground pavement in which securing the construction machine during maintenance procedures is simplified.

The above mentioned object is achieved by the features of the claims.

The invention advantageously specifies for a mount to be provided at the column element into which a locking element is insertable in such a fashion that the locking element, in the inserted condition, projects, at least in part, vis-à-vis the column element.

The locking element may limit, at least in one direction, the relative movement between the column element and guiding element. Inadvertent dropping of the machine frame can thus be prevented as the locking element limits inadvertent dropping of the lifting column.

The column element may be designed in the shape of a cylinder and may specifically be a hollow cylinder.

Height adjustment of the lifting column may be effected via a piston-cylinder unit, specifically, a hydraulic cylinder.

The locking element may be a bolt element. Compared with the supports used in the state of the art, this is a fairly small component which is easy to handle.

The mount in the column element may be a bore in the column element.

The cylindrical column element may feature a cylinder axis, and the bore may extend essentially perpendicular to the cylinder axis. In this arrangement, the bore may penetrate, wholly or in part, the wall of the column element.

The bore may be a continuous bore extending through the entire cylinder and extend at a distance to the cylinder axis.

The locking element may be a rod element which is insertable into the continuous bore in such a fashion that the rod element projects vis-à-vis the column element in two places.

Multiple mounts may be specified at the column element into which one each locking element is insertable.

The locking element may comprise a securing element which is clampable during insertion into the mount and thus prevents slipping of the locking element vis-à-vis the column element in the inserted condition.

The securing element may be an O-ring.

The locking element may comprise a step-shaped recess which comprises a supporting surface.

During maintenance procedures, the locking element may initially be inserted into the column element, and the guiding element may then be adjusted relative to the column element in such a fashion that the guiding element is supported on the step-shaped recess of the supporting surface. In this way, the locking element is additionally secured against slipping.

A storage container preferably arranged at the machine frame may be specified which may accommodate the no less than one locking element.

The storage container may comprise a switching element which allows the construction machine to be put into operation only when the switching element has been operated. The switching element is preferably operated when the no less than one locking element is accommodated in the storage container. Putting into operation of the construction machine can therefore be effected only when the locking element is located in the storage container.

If multiple locking elements are used, these may be accommodated either in a single storage container or in separate storage containers. When using a single storage container, the switching element is preferably operated only when all locking elements are accommodated in the storage container. If a separate storage container is specified for each locking element, putting into operation of the construction machine is preferably enabled only when the switching elements of all storage containers are operated. It can thus be ensured that the construction machine is put into operation again only when all locking elements have been removed from the lifting column.

According to the present invention, a method for transferring a construction machine for working a ground pavement into a maintenance position may furthermore be specified which comprises the following steps:

height adjustment of no less than one lifting column of the construction machine, where, during height adjustment of the lifting column, the machine frame is moved relative to the ground pavement, and where, during height adjustment of the lifting column, a column element of the lifting column is retracted into and/or extended out of a guiding element of the lifting column in a telescoping fashion.

It is advantageously specified that, during height adjustment of the lifting column, the machine frame is moved into a first maintenance position, where, upon or after reaching the first maintenance position, a locking element is inserted into a mount of the column element in such a fashion that the locking element, in the inserted condition, projects, at least in part, vis-à-vis the column element and limits, at least in one direction, a further height adjustment of the lifting column.

Following insertion of the locking element, the lifting column may be adjusted in height in such a fashion that the machine frame is lowered, vis-à-vis the first maintenance position, into a second maintenance position, where, in the second maintenance position, the guiding element is, at least in part, supported on the locking element.

BRIEF DESCRIPTION OF THE DRAWINGS

Hereinafter, embodiments of the invention are illustrated in more detail with reference to the drawings.

The following is shown schematically:

FIG. 6 schematically shows a further alternative embodiment.

FIG. 7 schematically shows a storage container including locking elements.

FIG. 8 schematically shows a storage container according to FIG. 7 with a locking element missing.

DETAILED DESCRIPTION

Figure 1:
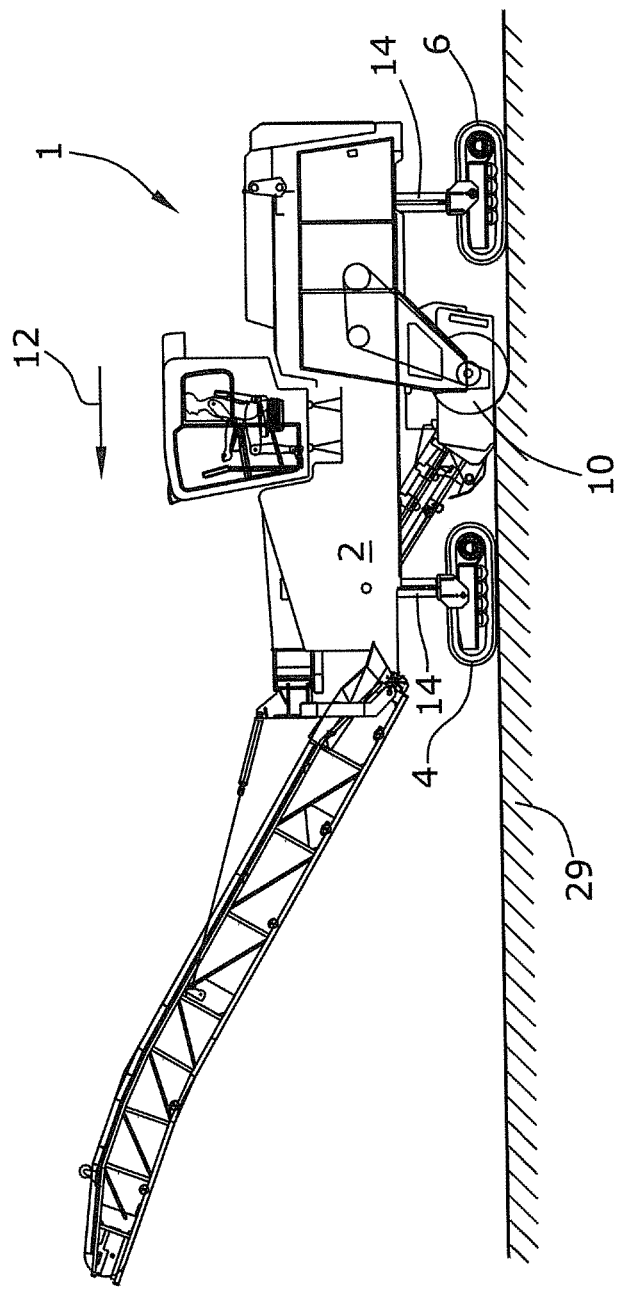
FIG. 1 schematically shows a construction machine.

A construction machine 1 for working a ground pavement 29 is represented in FIG. 1. In the present embodiment, the construction machine represented is a milling machine.

The construction machine 1 comprises, as a minimum, a machine frame 2. The construction machine 1 furthermore comprises front and rear travelling devices 4, 6 as seen in the direction of operation 12. The travelling devices 4, 6 may be wheels or tracked ground-engaging units. The travelling devices 4, 6 are connected to the machine frame 2 via lifting columns 14. The machine frame may be adjustable in height relative to the ground pavement by means of the lifting columns 14. The construction machine 1 designed as a milling machine in the embodiment represented furthermore comprises a milling drum 10 for working the ground pavement 29, where the milling drum 10 is adjustable in height together with the machine frame 2. Alternatively or additionally, the milling drum may be adjustable in height relative to the machine frame. The milling drum 10 is driven by a drive unit. The drive unit is preferably a drive motor, specifically, a combustion engine.

Figure 2:
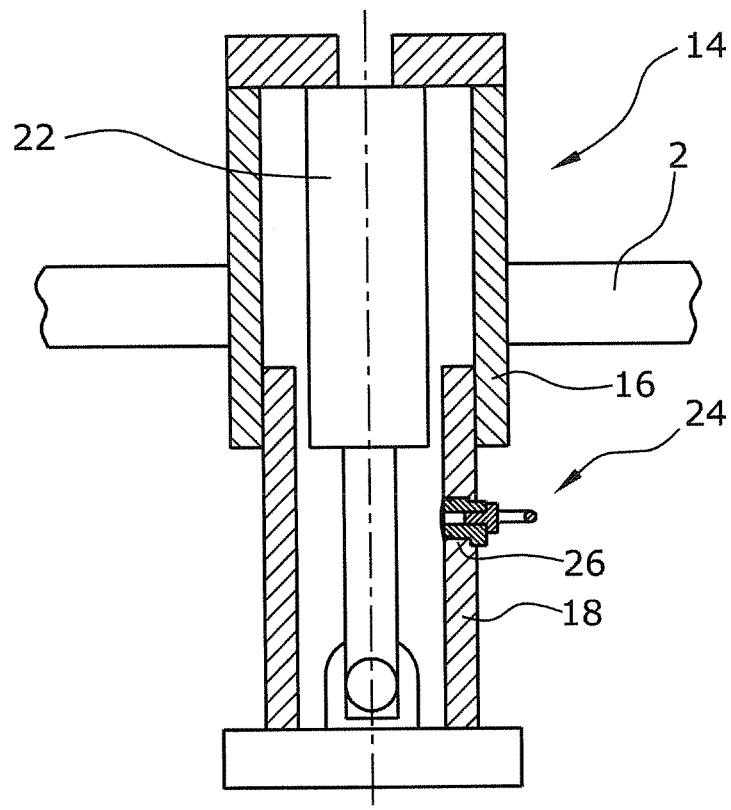
FIG. 2 schematically shows a lifting column of the construction machine including locking element.

A lifting column 14 is schematically represented in FIG. 2. The lifting column 14 is connected to the machine frame 2. The lifting column 14 is furthermore connected to the travelling device 4, 6, where only a section of the travelling device 4, 6 is represented in FIG. 2. The lifting column 14 comprises a column element 18 and a guiding element 16, where, during height adjustment of the lifting column 14, the column element 18 is retractable into and extendible out of the guiding element in a telescoping fashion by means of a piston-cylinder unit 22.

A mount 26 is provided in the column element 18 into which a locking element 24 is inserted in such a fashion that the locking element 24, in the inserted condition represented, projects outward, at least in part, vis-à-vis the column element 18.

Figure 3:
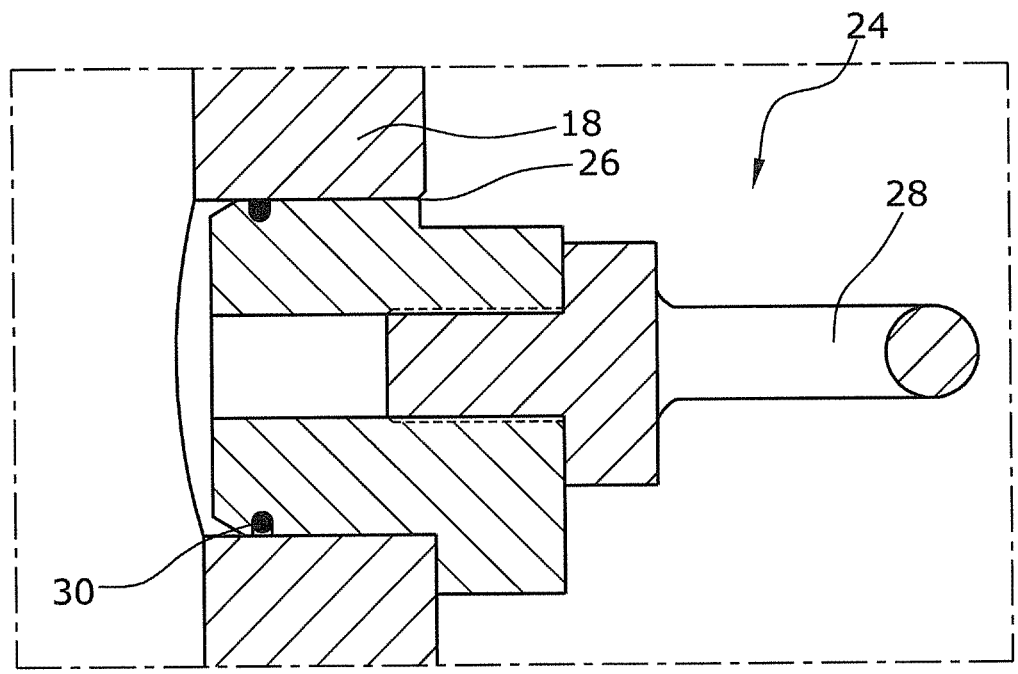
FIG. 3 schematically shows a detailed view of the lifting column according to FIG. 2 including locking element.

A section of the lifting column 14 including the locking element 24 is represented in more detail in FIG. 3. The mount 26 in the column element 18 may be a bore as in the embodiment represented. The locking element 24 may be a bolt element as in the embodiment represented. The locking element 24 may comprise a securing element 30 which is clampable or compressible during insertion into the mount 26 and thus prevents slipping of the locking element 24 vis-à-vis the column element 18 in the inserted condition. The securing element represented may be an O-ring. Said O-ring is arranged in a circumferential groove at the locking element 24. The O-ring preferably projects vis-à-vis the locking element 24 and is clamped or compressed during insertion. Slipping of the locking element 24 vis-à-vis the column element 18 in the inserted condition is thus prevented.

The locking element 24 furthermore comprises a ring element 28. By means of said ring element 28, the locking element 24 can be better pulled out of and/or also be better inserted into the mount 26. The locking element 24 and ring element 28 may be manufactured from a single piece or, as represented, assembled from different elements.

The construction machine 1 may be transferred into a first maintenance position. For this purpose, an adjustment in height of the no less than one lifting column 14 of the construction machine 1 is effected, where, during height adjustment of the lifting column 14, the machine frame 2 is moved relative to the ground pavement 29. During height adjustment of the lifting column 14, the column element 18 of the lifting column 14 is retracted into or extended out of the guiding element 16 of the lifting column 14 represented in FIG. 2 in a telescoping fashion. The lifting column may move the machine frame 2 into a first maintenance position, for example, by means of extending the piston-cylinder unit 22 and moving the column element 18 downward relative to the guiding element 16 of the lifting column. Due to the travelling device 4, 6 being supported on the ground pavement 29, the machine frame 2 is raised relative to the ground pavement by means of the relative movement of the column element 18 vis-à-vis the guiding element 16. Upon reaching or after reaching the first maintenance position, the locking element 24 is inserted into the mount 26 of the column element 18 in such a fashion that the locking element, in the inserted condition, projects, at least in part, vis-à-vis the column element 18 and limits, at least in one direction, a further height adjustment of the lifting column 14.

Figure 4:
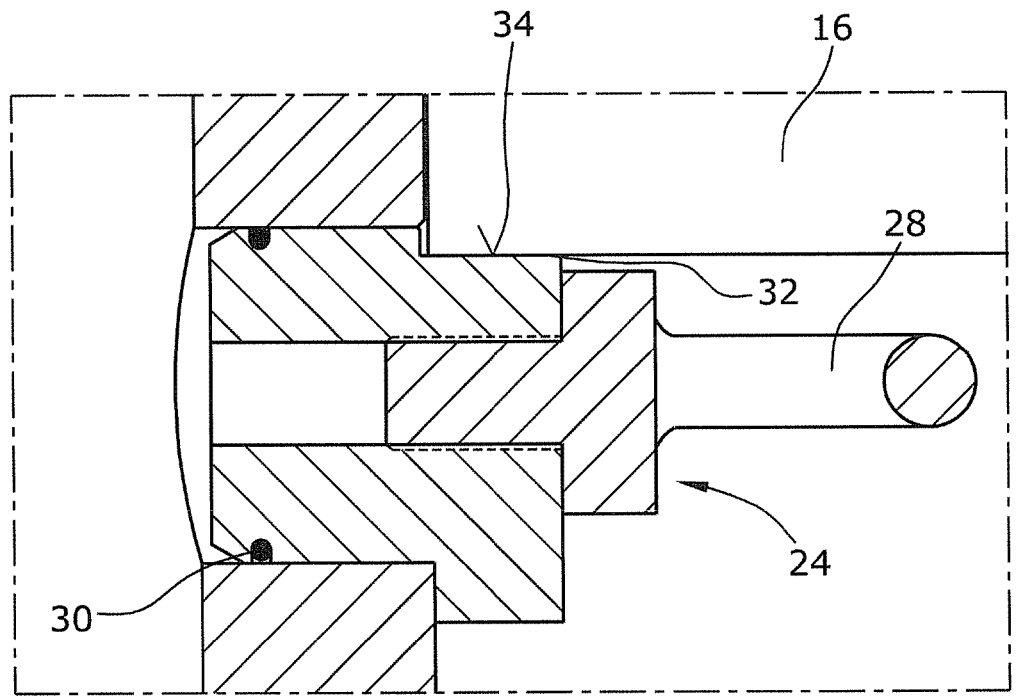
FIG. 4 schematically shows the locking element according to FIG. 3 including additional securing element.

It is represented in FIG. 4 as to how the locking element 24 limits, at least in one direction, a further height adjustment of the lifting column 14. The guiding element 16 hits the projecting part of the locking element 24. Dropping of the machine frame 2 beyond the locking element is thus prevented during a maintenance procedure. As is represented in FIG. 4, the locking element 24 may comprise a step-shaped recess 32 which comprises a supporting surface 34. As is represented in FIG. 4, the guiding element 16 is supported on the supporting surface 34.

It may be specified for the machine frame 2 to be initially moved into a first maintenance position in which the locking element 24 is inserted into the mount 26 of the column element 18 as described. The lifting column 14 may then be adjusted in height so that the machine frame is lowered, vis-à-vis the first maintenance position, into a second maintenance position, where, in the second maintenance position, the guiding element 16 is supported, as represented in FIG. 4, on the supporting surface 34 of the locking element 24. Due to a step-shaped recess 32 being specified, the guiding element 16 being supported additionally secures the locking element 24 against slipping out as the guiding element 16 lies, at least in part, in front of at least a part of the locking element 24, which is inserted in the mount 26, so that, in said condition, the locking element 24 cannot be pulled out of the mount 26.

Figure 5:
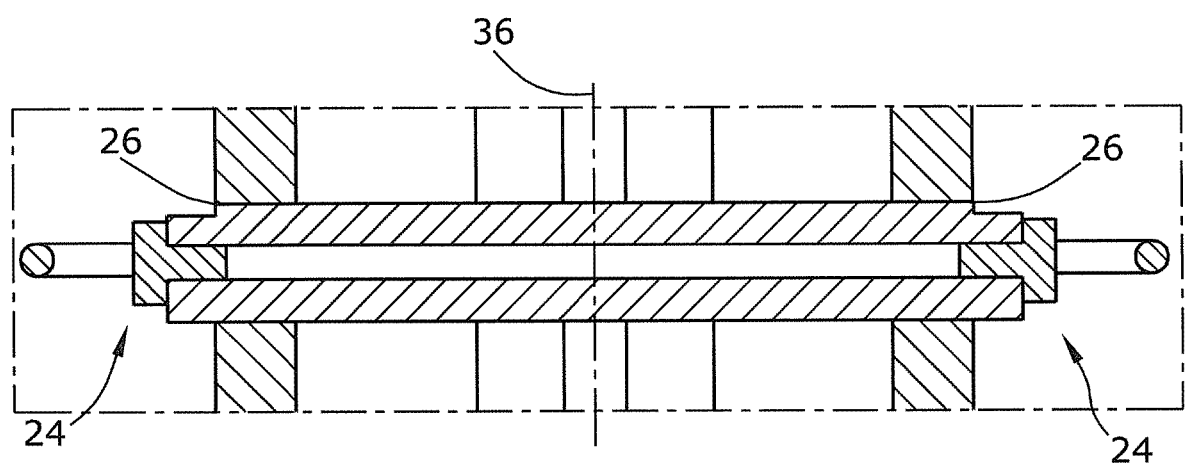
FIG. 5 schematically shows an alternative embodiment.

The column element may be designed in the shape of a cylinder, as represented, and may preferably be a hollow cylinder. Height adjustment of the lifting column 14 may be effected via a piston-cylinder unit 22, specifically, a hydraulic cylinder. The column element 18 preferably features a cylinder axis 36. The mount 26 designed as a bore extends essentially perpendicular to the cylinder axis 36. The mount 26 designed as a bore is, in the embodiment represented according to FIG. 5, a continuous bore through the entire column element 18. The continuous bore extends at a distance to the cylinder axis 36. The locking element 24 may be a rod element, as it is represented in FIG. 5. Said rod element may be inserted into the continuous bore in such a fashion that the rod element projects vis-à-vis the column element 18 in two places.

A further alternative embodiment is represented in FIG. 6 in which multiple mounts 26 are specified at the column element 18 into which one each locking element 24 is inserted. It is understood that the mounts 26 may also be specified at a vertical distance to one another. The locking elements may thus be fastened at the column element at different heights relative to the ground pavement 29. A limitation of the height adjustment can therefore be effected adapted to different maintenance tasks.

A storage container 38 is represented in FIG. 7. Said storage container 38 is preferably arranged at the machine frame 2. No less than one locking element 24 may be insertable into the receiving container 38. In the embodiment represented, multiple locking elements 24 may be inserted into the storage container 38. The storage container 38 comprises a switching element 40 which allows the construction machine 1 to be put into operation only when the switching element 40 has been operated. This is effected only when all locking elements 24 are guided into the storage container 38.

An embodiment in which a locking element has been removed is represented in FIG. 8. In this case, the switching element 40 would prevent that the construction machine 1 can be put into operation.

The invention claimed is:

1. A construction machine for working a ground surface, comprising:
   a machine frame;
   at least one lifting column;
   at least one travelling device configured to engage the ground surface, the at least one travelling device being connected to the machine frame via the at least one lifting column, the machine frame being adjustable in height relative to the ground surface by the at least one lifting column;
   the at least one lifting column including a column element and a guiding element, the column element being an inner tubular column element and the guiding element being an outer tubular guiding element, the inner tubular column element being telescopingly received in and retractable into and extendible out of the outer tubular guiding element in a telescoping manner during height adjustment of the at least one lifting column;
   a hydraulic piston-cylinder unit received in the inner tubular column element and connected between the inner tubular column element and the outer tubular guiding element for height adjustment of the lifting column;
   a mount provided in the inner tubular column element; and
   a locking element removably insertable into the mount such that when the locking element is inserted in the mount at least part of the locking element projects out of the inner tubular column element so as to limit retraction of the inner tubular column element into the outer tubular guiding element while permitting extension of the inner tubular column element out of the outer tubular guiding element.

2. The construction machine of claim 1, wherein the locking element comprises a bolt element.

3. The construction machine of claim 1, wherein the mount comprises a bore in the column element.

4. The construction machine of claim 3, wherein:
   the column element is a cylindrical column element having a cylinder axis, and the bore extends essentially perpendicular to the cylinder axis.

5. The construction machine of claim 1, wherein:
   the mount is a first mount located in the column element; and
   the column element includes a second mount spaced relative to the first mount along a height of the column element.

6. The construction machine of claim 1, wherein:
   the locking element includes a securing element configured to be compressed during insertion of the locking element into the mount to prevent slipping of the locking element from the column element.

7. The construction machine of claim 1, wherein:
   the locking element comprises a step-shaped recess defining a supporting surface for engaging the guiding element.

8. The construction machine of claim 1, further comprising:
   a storage container supported on the construction machine, the storage container being configured to receive the locking element.

9. The construction machine of claim 8, wherein:
   the storage container includes a switch configured to be operated by receipt of the locking element in the storage container such that the construction machine may be operated only when the locking element is received in the storage container and the switch has been operated.

10. A construction machine for working a ground surface, comprising:
    a machine frame;
    at least one lifting column;
    at least one travelling device configured to engage the ground surface, the at least one travelling device being connected to the machine frame via the at least one lifting column, the machine frame being adjustable in height relative to the ground surface by the at least one lifting column;
    the at least one lifting column including a column element and a guiding element, the column element being retractable into and extendible out of the guiding element in a telescoping manner during height adjustment of the at least one lifting column;
    a mount provided in the column element; and
    a locking element removably insertable into the mount such that when the locking element is inserted in the mount at least part of the locking element projects out of the column element;
    wherein the storage container includes a switch configured such that the construction machine may be operated only when the switch has been operated; and
    wherein the switch is configured such that the switch is operated only when a predetermined number of locking elements is present in the storage container.

11. A method of transferring a construction machine for working a ground surface into a maintenance position, the construction machine including a machine frame and at least one lifting column supporting the machine frame, the at least one lifting column including a guiding element and a column element extending out of the guiding element in a telescoping manner, the method comprising:

- adjusting a height of the machine frame relative to the ground surface to a first maintenance position by extending or retracting the column element relative to the guiding element to adjust a height of the at least one lifting column;
- inserting a locking element into a mount defined in the column element such that the locking element projects from the column element and limits, at least in one direction, a further height adjustment of the lifting column; and
- after inserting the locking element into the mount, and with the locking element remaining in place in the mount, further adjusting the height of the at least one lifting column such that the machine frame is lowered into a second maintenance position wherein the guiding element is at least in part supported on the locking element.

* * * * *